United States Patent Office 3,446,638
Patented May 27, 1969

3,446,638
OPTICAL FLINT GLASSES
Heinz Bromer, Hermannstein, and Norbert Meinert and Demetrius Ahl, Wetzlar, Germany, assignors to Ernst Leitz, G.m.b.H., Wetzlar, Lahn, Germany
No Drawing. Filed Jan. 18, 1965, Ser. No. 426,377
Claims priority, application Germany, Feb. 13, 1964, L 47,037
Int. Cl. C03c *3/12, 3/30*
U.S. Cl. 106—52      2 Claims

ABSTRACT OF THE DISCLOSURE

Optical flint glass free of color melted from a mixture of 27 to 42% by weight of silica and metal metaphosphates as the glass former, 20–43% by weight of titanium oxide and 22–50% by weight of alkali metal and alkaline earth oxides. In addition there is provided in the mixture lead oxide in amounts up to 28% by weight of oxides taken from the group of zinc, cadmium, bismuth, antimony, zirconium, tin, tungsten, tantalum and niobium. Certain critical ratios are described to effect the optical glass of the given properties.

---

Our present invention relates to optical flint glasses which, with medium indices of refraction, exhibit an exceptionally high dispersion.

It is known that, in the computing of optical systems, at least two lenses of glass types with different color dispersions are required for the correction of the aberrations which are caused by the color dispersion of every glass. The color dispersion itself is commonly designated by the Abbé value $v_e$. In optical computing the $v_e$ values relationship are thereby involved as can be easily shown (note Dr. Georg Franke, "Die Entwicklung der optischen Gläser" in "Glas-Email-Keramo-Technik," 11, 1960, pages 149–52), that the greater the ratio of the $v_e$ value of one glass to the $v_e$ value of the other glass, the more favorable are the correction conditions. Correction requires namely a condensing lens with the highest possible $v_e$ value and a correcting lens with the smallest $v_e$ value. The greater the ratio number, the lower can the individual refractive strengths of the lenses be held and the spherical aberration brought about by the spherical surfaces of the lenses is much smaller thereby.

In the heretofore known high value objectives, there were required for this purpose, for the condensing lenses, highly refractive glasses with high $v_e$ values which have lead to the evolution of the lanthanum-crown- and lanthanum-flint- glasses. These glasses were then combined with the known flint and heavy flint glasses. Thereby there resulted ratios of the $v_e$ values of these glasses which lay between 1.6 and 1.7.

The above mentioned lanthanum-crown- and lanthanum-flint glasses, respectively, have the great disadvantage, however, that for their preparation very expensive raw materials are required. Moreover, a part of the known glasses are of high thorium content so that they exhibit the known undesirable radioactive emanations. If one wishes to avoid these glasses, however, without thereby losing the optical correction quality, there are required for the condensation lenses, types of glasses whose $v_e$ values, with about equal refractive indices, lie lower than those of the lanthanum-crown- and lanthanum-flintglasses by about six units. For chromatic correction, there were accordingly required flint- and heavy flint- glasses whose $v_e$ values lie about 4 to 5 units lower than those of the heretofore known heavy flint glasses of a lead silicate base. There have been known heretofore, developments in this direction. Such glasses have, for example, been melted on a base of alkali fluoride-titanium oxide. Moreover, glasses of this type are known which are melted from a boric oxide. Moreover, glasses of this type are known which are melted from a boric oxide or silica base. A further system consists of silico-phosphate glasses. These glasses, however, exhibit either relatively low indices of refraction with too high $v_e$ values, or they are, becaus of their high color or low chemical stability, not usable in high quality optical systems.

The glasses of our present system exhibit values desired by the optical computer. Also they fulfill every otherwise useful requirement for optical glasses as, for example, freedom from color, good chemical stability, very good grinding and polishing capability. Also they are, through the use of less expensive raw materials, capable of being made moderate in price. According to the invention, the glasses are melted of mixtures which consist of from 27 to 42% by weight of silica and phosphoric acid anhydride ($P_2O_5$) as glass formers, of 20 to 43% by weight of titanium oxide and of 22 to 50% by weight of oxides of alkali and/or alkaline earth metals. The amount of silica is to be greater than 5% by weight, the amount of phosphoric acid greater than 7% by weight. In place of the alkali and/or alkaline earth metal oxides, oxides of lead up to 28% by weight as well as of oxides of zinc, cadmium, bismuth, antimony, zircon, tin, tungsten, tantalum and niobium up to a total of 10% by weight may be added without the desired $v_e$ value being thereby increased. The amount of alkaline earth and/or alkali metal oxides should not, however, fall below 22% by weight. It is advantageous to introduce the one- or twovalance metals into the mixture at least in part as phosphates. In certain cases it can be advantageous to substitute up to 10% by weight of the silica portion by boric oxide provided that the amount shall not fall short of the above given minimum portion of silica.

A number of examples of glasses made according to the invention are given in the following tables. In these tables the numerical data designated by $a$ indicate the sum of the glass formers in percent by weight, the numerical data designated by $b$ indicate the ratio by weight of silica to phosphoric acid, and the data identified with $c$ indicate the mol ratio of the sum of the alkali and alkaline earth metal oxides to titanium oxide. From the last mentioned data it is to be observed that this mol ratio must lie between 0.5 and 1.5. A deviation toward greater values is indeed possible, but because of the weakening of the chemical resistance and because the optical values to be expected are not useful, is not included in the invention. A deviation downward leads in each case to strongly colored glasses.

In Table 1 there is shown an interchange of the potassium metaphosphate and the metaphosphates of the bivalent elements. It will be noted that with increasing atomic weight of the elements introduced as metaphosphates the index of refraction rises with simultaneous lowering of the $v_e$ values. The $v_e$ values of the glasses illustrated in this table lie on an average about five units lower than the known flint- and heavy flint-glasses for about the same indices of refraction. In the following Table 1, as well as the subsequent tables, the compound sodium metaphosphate $NaPO_3$ is shown, although it will be understood that the formula may also be $NaO_{0.5} PO_{2.5}$.

TABLE 1

| Melt No. | PbTi 33 | PbTi 40 | PbTi 41 | PbTi 38 | PbTi 39 | PbTi 47 | PbTi 48 | PbTi 42 | PbTi 43 | PbTi 45 | PbTi 46 |
|---|---|---|---|---|---|---|---|---|---|---|---|
| a | 39.0002 | 39.8888 | 40.7773 | 39.5788 | 40.1573 | 39.1728 | 39.3453 | 38.6199 | 38.2395 | 37.9384 | 36.8765 |
| b | 0.6595 | 0.6355 | 0.6131 | 0.6437 | 0.6286 | 0.6547 | 0.6500 | 0.6704 | 0.6816 | 0.6907 | 0.7250 |
| c | 0.8265 | 0.8411 | 0.8578 | 0.8366 | 0.8467 | 0.7731 | 0.7196 | 0.7731 | 0.7196 | 0.7731 | 0.7196 |
| $SiO_2$ | 15.5 | 15.5 | 15.5 | 15.5 | 15.5 | 15.5 | 15.5 | 15.5 | 15.5 | 15.5 | 15.5 |
| $NaPO_3$ | 10.1 | 10.1 | 10.1 | 10.1 | 10.1 | 10.1 | 10.1 | 10.1 | 10.1 | 10.1 | 10.1 |
| $KPO_3$ | 27.4 | 22.4 | 17.4 | 22.4 | 17.4 | 22.4 | 17.4 | 22.4 | 17.4 | 22.4 | 17.4 |
| $Mg(PO_3)_2$ | | 5.0 | 10.0 | | | | | | | | |
| $Ca(PO_3)_2$ | | | | 5.0 | 10.0 | | | | | | |
| $Zn(PO_3)_2$ | | | | | | 5.0 | 10.0 | | | | |
| $Cd(PO_3)_2$ | | | | | | | | 5.0 | 10.0 | | |
| $Pb(PO_3)_2$ | | | | | | | | | | 5.0 | 10.0 |
| $K_2O$ | 15.3 | 15.3 | 15.3 | 15.3 | 15.3 | 15.3 | 15.3 | 15.3 | 15.3 | 15.3 | 15.3 |
| $TiO_2$ | 31.7 | 31.7 | 31.7 | 31.7 | 31.7 | 31.7 | 31.7 | 31.7 | 31.7 | 31.7 | 31.7 |
| $n_e$ | 1.6832 | 1.6943 | 1.7075 | 1.6925 | 1.6967 | 1.6954 | 1.7044 | 1.7004 | 1.7130 | 1.7038 | 1.7231 |
| $v_e$ | 27.4 | 26.2 | 26.1 | 26.9 | 26.9 | 26.7 | 26.1 | 26.5 | 25.8 | 26.3 | 25.3 |

In Table 2 are melts of glasses developed from the glasses of Table 1. In these glasses, however, the potassium oxide is replaced by oxides of other monovalent, of bivalent or of trivalent elements, bismuth and antimony respectively, or of the four valent elements zirconium and tin. Also in these glasses there is shown the increase in the index of refraction with increase in the atomic weight of the elements whose oxides are substituted.

TABLE 2

| Melt No. | PbTi 33 | PbTi 52 | PbTi 51 | PbTi 53 | PbTi 54 | PbTi 68 | PbTi 57 | PbTi 56 | PbTi 59 | PbTi 58 |
|---|---|---|---|---|---|---|---|---|---|---|
| a | 39.0002 | 39.0002 | 39.0002 | 39.0002 | 39.0002 | 39.0002 | 39.0002 | 39.0002 | 39.0002 | 39.0002 |
| b | 0.6595 | 0.6595 | 0.6595 | 0.6595 | 0.6595 | 0.6595 | 0.6595 | 0.6595 | 0.6595 | 0.6595 |
| c | 0.8265 | 0.9702 | 1.1141 | 0.8958 | 0.9652 | 1.0073 | 0.7930 | 0.7597 | 0.7816 | 0.7370 |
| $SiO_2$ | 15.5 | 15.5 | 15.5 | 15.5 | 15.5 | 15.5 | 15.5 | 15.5 | 15.5 | 15.5 |
| $NaPO_3$ | 10.1 | 10.1 | 10.1 | 10.1 | 10.1 | 10.1 | 10.1 | 10.1 | 10.1 | 10.1 |
| $KPO_3$ | 27.4 | 27.4 | 27.4 | 27.4 | 27.4 | 27.4 | 27.4 | 27.4 | 27.4 | 27.4 |
| $TiO_2$ | 31.7 | 31.7 | 31.7 | 31.7 | 31.7 | 31.7 | 31.7 | 31.7 | 31.7 | 31.7 |
| $K_2O$ | 15.3 | 12.8 | 10.3 | 10.3 | 5.3 | 2.3 | 12.8 | 10.3 | 12.8 | 10.3 |
| $Li_2O$ | | 2.5 | 5.0 | | | | | | | |
| $Na_2O$ | | | | 5.0 | 10.0 | 13.0 | | | | |
| $Rb_2O$ | | | | | | | 2.5 | 5.0 | | |
| $Cs_2O$ | | | | | | | | | 2.5 | 5.0 |
| MgO | | | | | | | | | | |
| CaO | | | | | | | | | | |
| $n_e$ | 1.6832 | 1.6993 | 1.7040 | 1.6886 | 1.6929 | 1.6922 | 1.6940 | 1.7018 | 1.6930 | 1.7037 |
| $v_e$ | 27.4 | 27.0 | 27.2 | 27.2 | 26.4 | 27.3 | 26.5 | 25.9 | 26.9 | 25.7 |

TABLE 2 (First Continuation—Part 1)

| Melt No. | PbTi 75 | PbTi 73 | PbTi 61 | PbTi 55 | PbTi 62 | PbTi 63 |
|---|---|---|---|---|---|---|
| a | 39.0002 | 39.0002 | 39.0002 | 39.0002 | 39.0002 | 39.0002 |
| b | 0.6595 | 0.6595 | 0.6595 | 0.6595 | 0.6595 | 0.6595 |
| c | 0.9158 | 1.0052 | 0.8716 | 0.9170 | 0.8202 | 0.8242 |
| $SiO_2$ | 15.5 | 15.5 | 15.5 | 15.5 | 15.5 | 15.5 |
| $NaPO_3$ | 10.1 | 10.1 | 10.1 | 10.1 | 10.1 | 10.1 |
| $KPO_3$ | 27.4 | 27.4 | 27.4 | 27.4 | 27.4 | 27.4 |
| $TiO_2$ | 31.7 | 31.7 | 31.7 | 31.7 | 31.7 | 31.7 |
| $K_2O$ | 12.8 | 10.3 | 12.8 | 10.3 | 12.8 | 10.3 |
| MgO | 2.5 | 5.0 | | | | |
| CaO | | | 2.5 | 5.0 | | |
| SrO | | | | | 2.5 | 5.0 |
| BaO | | | | | | |
| ZnO | | | | | | |
| CdO | | | | | | |
| $n_e$ | 1.6960 | 1.6080 | 1.6925 | 1.7028 | 1.6962 | 1.7066 |
| $v_e$ | 26.7 | 26.8 | 27.4 | 27.3 | 26.8 | 26.3 |

TABLE 2 (First Continuation—Part 2)

| Melt No. | PbTi 66 | PbTi 65 | PbTi 70 | PbTi 69 | PbTi 78 | PbTi 77 |
|---|---|---|---|---|---|---|
| a | 39.0002 | 39.0002 | 39.0002 | 39.0002 | 39.0002 | 39.0002 |
| b | 0.6595 | 0.6595 | 0.6595 | 0.6595 | 0.6595 | 0.6595 |
| c | 0.8006 | 0.7748 | 0.7595 | 0.6927 | 0.7595 | 0.6927 |
| $SiO_2$ | 15.5 | 15.5 | 15.5 | 15.5 | 15.5 | 15.5 |
| $NaPO_3$ | 10.1 | 10.1 | 10.1 | 10.1 | 10.1 | 10.1 |
| $KPO_3$ | 27.4 | 27.4 | 27.4 | 27.4 | 27.4 | 27.4 |
| $TiO_2$ | 31.7 | 31.7 | 31.7 | 31.7 | 31.7 | 31.7 |
| $K_2O$ | 12.8 | 10.3 | 12.8 | 10.3 | 12.8 | 10.3 |
| MgO | | | | | | |
| CaO | | | | | | |
| SrO | | | | | | |
| BaO | 2.5 | 5.0 | | | | |
| ZnO | | | 2.5 | 5.0 | | |
| CdO | | | | | 2.5 | 5.0 |
| $n_e$ | 1.6986 | 1.7097 | 1.7006 | 1.7090 | 1.7008 | 1.7136 |
| $v_e$ | 26.6 | 26.0 | 26.3 | 25.9 | 26.4 | 25.4 |

TABLE 2 (Second Continuation—Part 2)

| Melt No. | PbTi 93 | PbTi 92 | PbTi 98 | PbTi 97 | PbTi 100 | PbTi 99 | PbTi 95 | PbTi 96 | PbTi 91 |
|---|---|---|---|---|---|---|---|---|---|
| a | 39.0002 | 39.0002 | 39.0002 | 39.0002 | 39.0002 | 39.0002 | 39.0002 | 39.0002 | 39.0002 |
| b | 0.6595 | 0.6595 | 0.6595 | 0.6595 | 0.6595 | 0.6595 | 0.6595 | 0.6595 | 0.6595 |
| c | 0.7595 | 0.6927 | 0.7595 | 0.6927 | 0.7595 | 0.6927 | 0.7595 | 0.6927 | 0.7595 |
| $SiO_2$ | 15.5 | 15.5 | 15.5 | 15.5 | 15.5 | 15.5 | 15.5 | 15.5 | 15.5 |
| $NaPO_3$ | 10.1 | 10.1 | 10.1 | 10.1 | 10.1 | 10.1 | 10.1 | 10.1 | 10.1 |
| $KPO_3$ | 27.4 | 27.4 | 27.4 | 27.4 | 27.4 | 27.4 | 27.4 | 27.4 | 27.4 |
| $TiO_2$ | 31.7 | 31.7 | 31.7 | 31.7 | 31.7 | 31.7 | 31.7 | 31.7 | 31.7 |
| $K_2O$ | 12.8 | 10.3 | 12.8 | 10.3 | 12.8 | 10.3 | 12.8 | 10.3 | 12.8 |
| PbO | 2.5 | 5.0 | | | | | | | |
| $Bi_2O_3$ | | | 2.5 | 5.0 | | | | | |
| $Sb_2O_3$ | | | | | 2.5 | 5.0 | | | |
| $ZrO_2$ | | | | | | | 2.5 | 5.0 | |
| $SnO_2$ | | | | | | | | | 2.5 |
| $n_e$ | 1.7044 | 1.7200 | 1.7037 | 1.7223 | 1.7064 | 1.7268 | 1.7066 | 1.7194 | 1.7020 |
| $v_e$ | 25.9 | 24.8 | 25.8 | 24.7 | 25.6 | 24.3 | 26.1 | 25.5 | 26.2 |

In Table 3a is shown the effect which is caused by a substitution of silica by potassium arsenate and/or a substitution of titanium oxide by tungsten oxide.

TABLE 3a

| Melt No. | PbTi 33 | PbTi 81 | PbTi 101 | PbTi 112 |
|---|---|---|---|---|
| $a$ | 39.0002 | 34.0002 | 39.0002 | 34.0002 |
| $b$ | 0.6595 | 0.4468 | 0.6595 | 0.4468 |
| $c$ | 0.8265 | 0.8653 | 0.9814 | 1.0275 |
| $SiO_2$ | 15.5 | 10.5 | 15.5 | 10.5 |
| $LiPO_3$ | | | | |
| $NaPO_3$ | 10.1 | 10.1 | 10.1 | 10.1 |
| $KPO_3$ | 27.4 | 27.4 | 27.4 | 27.4 |
| $K_2O$ | 15.3 | 15.3 | 15.3 | 15.3 |
| $TiO_2$ | 31.7 | 31.7 | 26.7 | 26.7 |
| $KAsO_3$ | | 5.0 | | 5.0 |
| $Bi_2O_3$ | | | 5.0 | 5.0 |
| $n_e$ | 1.6832 | 1.6934 | 1.6746 | 1.6825 |
| $v_e$ | 27.4 | 26.6 | 27.8 | 27.4 |

In Table 3b examples are given in which in addition to the given modifications of the preceding tables a substitution of potassium metaphosphate by lithium metaphosphate is given.

TABLE 3b

| Melt No. | PbTi 33 | PbTi 37 | PbTi 83 | PbTi 137 | PbTi 138 | PbTi 133 |
|---|---|---|---|---|---|---|
| $a$ | 39.0002 | 41.2503 | 36.2503 | 41.2503 | 41.2503 | 36.2503 |
| $b$ | 0.6595 | 0.6019 | 0.4077 | 0.6019 | 0.6019 | 0.4077 |
| $c$ | 0.8265 | 0.8661 | 0.9049 | 0.9403 | 1.0284 | 1.0745 |
| $SiO_2$ | 15.5 | 15.5 | 10.5 | 15.5 | 15.5 | 10.5 |
| $LiPO_3$ | | 10.0 | 10.0 | 10.0 | 10.0 | 10.0 |
| $NaPO_3$ | 10.1 | 10.1 | 10.1 | 10.1 | 10.1 | 10.1 |
| $KPO_3$ | 27.4 | 17.4 | 17.4 | 17.4 | 17.4 | 17.4 |
| $K_2O$ | 15.3 | 15.3 | 15.3 | 15.3 | 15.3 | 15.3 |
| $TiO_2$ | 31.7 | 31.7 | 31.7 | 29.2 | 26.7 | 26.7 |
| $KAsO_3$ | | | 5.0 | | | 5.0 |
| $Bi_2O_3$ | | | | 2.5 | 5.0 | 5.0 |
| $n_e$ | 1.6832 | 1.7060 | 1.7148 | 1.6990 | 1.6949 | 1.7050 |
| $v_e$ | 27.4 | 25.1 | 25.4 | 26.4 | 26.6 | 25.8 |

Table 3c shows further examples for which the same holds as in the examples of Table 3b.

TABLE 3c

| Melt No. | PbTi 33 | PbTi 36 | PbTi 132 |
|---|---|---|---|
| $a$ | 39.0002 | 40.1250 | 35.1215 |
| $b$ | 0.6595 | 0.6295 | 0.4264 |
| $c$ | 0.8265 | 0.8462 | 1.0508 |
| $SiO_2$ | 15.5 | 15.5 | 10.5 |
| $LiPO_3$ | | | 5.0 |
| $NaPO_3$ | 10.1 | 10.1 | 10.1 |
| $KPO_3$ | 27.4 | 22.4 | 22.4 |
| $K_2O$ | 15.3 | 15.3 | 15.3 |
| $TiO_2$ | 31.7 | 31.7 | 26.7 |
| $KAsO_3$ | | | 5.0 |
| $Bi_2O_3$ | | | 5.0 |
| $n_e$ | 1.6832 | 1.7009 | 1.6971 |
| $v_e$ | 27.4 | 26.1 | 26.2 |

Table 4 shows the influence of a substitution of silica by boron trioxide. From the examples it should be noted that such substitution in every example of Tables 1 to 3c can be undertaken without doing anything further.

TABLE 4

| Melt No. | PbTi 136 | PbTi 161 | PbTi 160 | PbTi 180 | PbTi 181 | PbTi 163 |
|---|---|---|---|---|---|---|
| $a$ | 41.2503 | 39.7267 | 39.7267 | 40.6591 | 40.6591 | 39.7267 |
| $b$ | 0.2990 | 0.2524 | 0.3426 | 0.2109 | 0.2109 | 0.2524 |
| $c$ | 0.8661 | 0.8718 | 0.8718 | 1.1157 | 1.1157 | 1.0463 |
| $SiO_2$ | 7.7 | 7.0 | 9.5 | 6.3 | 6.3 | 7.0 |
| $B_2O_3$ | 7.8 | 5.0 | 2.5 | 4.5 | 4.5 | 5.0 |
| $LiPO_3$ | 10.0 | | | | | |
| $NaPO_3$ | 10.1 | 5.0 | 5.0 | 4.5 | 4.5 | 5.0 |
| $KPO_3$ | 17.4 | 40.7 | 40.7 | 41.8 | 41.8 | 40.7 |
| $K_2O$ | 15.3 | 12.3 | 12.3 | 11.1 | 11.1 | 12.3 |
| $KAsO_3$ | | | | | | |
| $TiO_2$ | 31.7 | 30.0 | 30.0 | 24.3 | 24.3 | 25.0 |
| $Bi_2O_3$ | | | | 4.5 | | 5.0 |
| $Na_4P_2O_7$ | | | | 3.0 | 3.0 | |
| $PbO$ | | | | | 4.5 | |
| $Sb_2O_3$ | | | | | | |
| $n_e$ | 1.7184 | 1.6914 | 1.6867 | 1.6691 | 1.6759 | 1.6738 |
| $v_e$ | 24.8 | 25.7 | 26.2 | 27.5 | 26.7 | 27.3 |

| Melt No. | PbTi 165 | PbTi 166 | PbTi 157 | PbTi 140 | PbTi 152 | PbTi 86 |
|---|---|---|---|---|---|---|
| $a$ | 39.7267 | 39.7267 | 34.9790 | 39.9884 | 36.9829 | 28.9998 |
| $b$ | 0.2524 | 0.2524 | 0.3782 | 0.3334 | 0.3706 | 0.2340 |
| $c$ | 1.0463 | 1.0463 | 0.8699 | 0.8708 | 0.8553 | 0.9042 |
| $SiO_2$ | 7.0 | 7.0 | 9.6 | 10.0 | 10.0 | 5.5 |
| $B_2O_3$ | 5.0 | 5.0 | | | | |
| $LiPO_3$ | | | | | | |
| $NaPO_3$ | 5.0 | 5.0 | 5.2 | 5.0 | 5.0 | 10.1 |
| $KPO_3$ | 40.7 | 40.7 | 36.2 | 44.1 | 39.1 | 27.4 |
| $K_2O$ | 12.3 | 12.3 | 16.5 | 10.9 | 10.9 | 15.3 |
| $KAsO_3$ | | | | | 5.0 | 10.0 |
| $TiO_2$ | 25.0 | 25.0 | 32.5 | 30.0 | 30.0 | 31.7 |
| $Bi_2O_3$ | | 2.5 | | | | |
| $Na_4P_2O_7$ | | | | | | |
| $PbO$ | | | | | | |
| $Sb_2O_3$ | 5.0 | 2.5 | | | | |
| $n_e$ | 1.6764 | 1.6755 | 1.6806 | 1.6811 | 1.6913 | 1.6985 |
| $v_e$ | 27.0 | 27.1 | 27.6 | 26.3 | 25.4 | 26.0 |

In Table 5 the influence of oxides of tungsten, tantalum and/or niobium are shown.

TABLE 5

| Melt No. | PbTi 170 | PbTi 174 | PbTi 179 | PbTi 172 |
|---|---|---|---|---|
| $a$ | 35.9124 | 35.0283 | 32.6624 | 37.9717 |
| $b$ | 0.1617 | 0.1665 | 0.1807 | 0.3289 |
| $c$ | 1.6273 | 0.9765 | 0.8516 | 1.3563 |
| $SiO_2$ | 5.0 | 5.0 | 5.0 | 9.4 |
| $Na_2P_2O_7$ | 14.4 | 9.9 | 5.0 | 9.4 |
| $NaPO_3$ | 16.7 | 9.9 | 10.0 | 9.4 |
| $KPO_3$ | 19.3 | 29.7 | 30.0 | 28.3 |
| $K_2O$ | 14.3 | 10.8 | 10.0 | 15.3 |
| $TiO_2$ | 20.8 | 29.7 | 30.0 | 23.5 |
| $WO_3$ | 7.2 | | 5.0 | |
| $Ta_2O_5$ | | 5.0 | 5.0 | 4.7 |
| $Nb_2O_5$ | 2.3 | | | |
| $n_e$ | 1.6529 | 1.6950 | 1.7070 | 1.6467 |
| $v_e$ | 29.3 | 25.9 | 25.1 | 30.2 |

In the examples of Table 6 beside a substitution of silica by boric oxide there is shown the application of bismuth and antimony respectively.

TABLE 6

| Melt No. | PbTi 160 | PbTi 161 | PbTi 166 | PbTi 163 | PbTi 165 | PbTi 37 | PbTi 136 | PbTi 181 | PbTi 180 |
|---|---|---|---|---|---|---|---|---|---|
| a | 39.7267 | 39.7267 | 39.7267 | 39.7267 | 39.7267 | 41.2503 | 41.2503 | 40.6591 | 40.6591 |
| b | 0.3426 | 0.2524 | 0.2524 | 0.2524 | 0.2524 | 0.6019 | 0.2990 | 0.2190 | 0.2190 |
| c | 0.8718 | 0.8718 | 1.0463 | 1.0463 | 1.0463 | 0.8661 | 0.8661 | 1.1157 | 1.1157 |
| $SiO_2$ | 9.5 | 7.0 | 7.0 | 7.0 | 7.0 | 15.5 | 7.7 | 6.3 | 6.3 |
| $B_2O_3$ | 2.5 | 5.0 | 5.0 | 5.0 | 5.0 |  | 7.8 | 4.5 | 4.5 |
| $LiPO_3$ |  |  |  |  |  | 10.0 | 10.0 |  |  |
| $NaPO_3$ | 5.0 | 5.0 | 5.0 | 5.0 | 5.0 | 10.1 | 10.1 | 4.5 | 4.5 |
| $KPO_3$ | 40.7 | 40.7 | 40.7 | 40.7 | 40.7 | 17.4 | 17.4 | 41.8 | 41.8 |
| $K_2O$ | 12.3 | 12.3 | 12.3 | 12.3 | 12.3 | 15.3 | 15.3 | 11.1 | 11.1 |
| $TiO_2$ | 30.0 | 30.0 | 25.0 | 25.0 | 25.0 | 31.7 | 31.7 | 24.3 | 24.3 |
| $Na_4P_2O_7$ |  |  |  |  |  |  |  | 3.0 | 3.0 |
| PbO |  |  |  |  |  |  |  | 4.5 |  |
| $Bi_2O_3$ |  |  | 2.5 | 5.0 |  |  |  |  | 4.5 |
| $Sb_2O_3$ |  |  | 2.5 |  | 5.0 |  |  |  |  |
| $n_e$ | 1.6867 | 1.6914 | 1.6755 | 1.6738 | 1.6764 | 1.7060 | 1.7184 | 1.6759 | 1.6691 |
| $v_e$ | 26.2 | 25.7 | 27.1 | 27.3 | 27.0 | 25.1 | 24.8 | 26.7 | 27.5 |

Finally, Table 7 shows the influence of the substitution of various phosphates of monovalent and bivalent metals relative to one another.

TABLE 7

| Melt No. | PbTi 11 | PbTi 23 | PbTi 28 | PbTi 150 | PbTi 12 | PbTi 10 |
|---|---|---|---|---|---|---|
| a | 35.4090 | 29.0608 | 33.5867 | 34.9758 | 34.8868 | 27.8374 |
| b | 3.1613 | 3.1749 | 1.1687 | 2.9854 | 3.1597 | 2.2228 |
| c | 1.0007 | 0.6093 | 0.6689 | 0.8899 | 1.0007 | 0.8480 |
| $SiO_2$ | 26.9 | 22.1 | 18.1 | 26.2 | 26.5 | 19.2 |
| $LiPO_3$ | 10.3 |  |  |  |  |  |
| $NaPO_3$ |  | 10.0 | 9.9 |  |  |  |
| $KPO_3$ |  |  | 14.3 | 14.6 |  |  |
| $Ca(PO_3)_2$ |  |  |  |  | 11.7 |  |
| $Pb_2P_2O_7$ |  |  |  |  |  | 35.8 |
| $K_2O$ | 31.4 | 25.7 | 19.7 | 24.2 | 30.9 | 22.5 |
| $KAsO_3$ |  |  |  | 5.0 |  |  |
| $TiO_2$ | 31.4 | 42.2 | 38.0 | 30.0 | 30.9 | 22.5 |
| $n_e$ | 1.6624 | 1.7394 | 1.724 | 1.6505 | 1.6802 | 1.7352 |
| $v_e$ | 32.1 | 25.3 | 25.4 | 31.8 | 29.7 | 26.1 |

The glasses according to the invention are suitably melted down in platinum crucibles. Following is given the procedure for a melt of two kilograms:

The melt mixture consisted of 7.5 parts by weight of silica, 10.1 parts by weight of sodium metaphosphate, 26.8 parts by weight of potassium phosphate, 12.5 parts by weight of potassium oxide, 7.3 parts by weight of lead oxide and 27.6 parts by weight of titanium dioxide.

The above ingredients were thoroughly mixed and placed in successive portions into a platinum crucible at a temperature of 1150° C. and melted down. Then the temperature was raised to 1200° C. and refined by constant stirring. When the melt was free from bubbles the temperature was lowered to 1100° C. and held at this temperature for about 15 minutes. Thereafter the melt was permitted to cool to 900° C. After reaching this temperature the melt was cast into heated molds. The molded glass was followed by cooling and tempering according to the commonly known methods. The glass exhibited the following physical values:

| | |
|---|---|
| $n_e$ | 1.6761 |
| $v_e$ | 28.3 |
| Specific weight | 3.00 |
| Transformation point | ° C 415 |
| Softening point | ° C 475 |

Having described our invention, we claim:

1. Optical flint glass substantially free of color which consists essentially of the following constituents:

(A) silica and phosphates of mono and divalent elements as glass formers yielding 27.0 to 42.0 by weight of silica and phosphates calculated on the basis of $P_2O_5$, and of which silica is not less than 5% by weight and the phosphates ($P_2O_5$) are not less than 7% by weight;

(B) titanium oxide 20 to 43% by weight;

(C) oxides of the group consisting of the oxides of sodium, potassium, lithium, rubidium, caesium, magnesium, calcium, strontium and barium 22 to 50% by weight and in which the mol ratio to titanium oxide is between 0.5 and 1.5;

(D) lead oxide 0 to 28% by weight;

(E) oxides of the group of metals consisting of zinc, cadmium, bismuth, antimony, zirconium, tin, tungsten, tantalum, and niobium to a total of 0–10% by weight; and in which the sum of the oxides listed under (C) and (E) is limited to 50% by weight, and in which oxides of (C) must be present in a minimum of 22% by weight.

2. Optical flint glass according to claim 1 characterized in that the silica is substituted up to 10% by weight by boric oxide and in which the amount of silica is not less than 5% by weight.

References Cited

UNITED STATES PATENTS 3,100,714 8/1963 Bromer et al. _____ 106—54
3,328,181 6/1967 Weidel _____ 106—47

HELEN M. McCARTHY, *Primary Examiner.*

W. R. SATTERFIELD, *Assistant Examiner.*

U.S. Cl. X.R.

106—53, 54